(12) United States Patent
Oman et al.

(10) Patent No.: US 10,506,040 B2
(45) Date of Patent: Dec. 10, 2019

(54) AGGREGATE SERVICE WITH ENHANCED REMOTE DEVICE MANAGEMENT

(71) Applicant: Lenovo (Singapore) Pte. Ltd., Singapore (SG)

(72) Inventors: Christopher Donald Oman, Fort Wayne, IN (US); Tony Eugene Thompson, Leo, IN (US); Daniel Robert Carter, Fort Wayne, IN (US); Christopher Scott Long, Raleigh, NC (US); Trevin Michael Forkert, Fort Wayne, IN (US); Philip L. Childs, Fort Wayne, IN (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 95 days.

(21) Appl. No.: 14/528,232

(22) Filed: Oct. 30, 2014

(65) Prior Publication Data

US 2016/0127338 A1    May 5, 2016

(51) Int. Cl.
*H04L 29/08* (2006.01)
*H04L 29/06* (2006.01)

(52) U.S. Cl.
CPC ........ *H04L 67/1097* (2013.01); *H04L 63/083* (2013.01); *H04L 63/0884* (2013.01); *H04L 63/102* (2013.01)

(58) Field of Classification Search
CPC ......... H04L 67/14; H04L 67/24; H04L 69/32; H04L 69/327
USPC .......................................................... 726/5
See application file for complete search history.

(56) References Cited

U.S. PATENT DOCUMENTS

| | | | | |
|---|---|---|---|---|
| 9,471,576 | B1 * | 10/2016 | Kaiser, IV | G06F 16/113 |
| 2008/0154903 | A1 * | 6/2008 | Crowley | H04L 63/104 |
| 2009/0228962 | A1 * | 9/2009 | Pathak | G06F 21/6209 |
| | | | | 726/5 |
| 2010/0279667 | A1 * | 11/2010 | Wehrs | G06Q 30/02 |
| | | | | 455/414.1 |
| 2010/0287219 | A1 * | 11/2010 | Caso | G06F 16/134 |
| | | | | 707/827 |
| 2013/0191339 | A1 * | 7/2013 | Haden | H04L 65/403 |
| | | | | 707/638 |
| 2013/0268862 | A1 * | 10/2013 | Glaser | G06F 3/04847 |
| | | | | 715/738 |
| 2014/0101740 | A1 * | 4/2014 | Li | G06F 21/32 |
| | | | | 726/7 |
| 2015/0031381 | A1 * | 1/2015 | Kotecha | H04W 4/70 |
| | | | | 455/452.1 |
| 2015/0089621 | A1 * | 3/2015 | Khalid | H04L 63/08 |
| | | | | 726/9 |

(Continued)

*Primary Examiner* — Joseph P Hirl
*Assistant Examiner* — Sayed Aresh Beheshti Shirazi
(74) *Attorney, Agent, or Firm* — Ference & Associates LLC

(57) ABSTRACT

One embodiment provides a method, including: receiving, from a client device, a request by a user to access an aggregate service device; authenticating, at the aggregate service device, the user to provide access to at least one remote device; providing, by the aggregate service device, data analogous to data of the at least one remote device; receiving, by the aggregate service device, a selection of data accessible by the user from the at least one remote device; and facilitating data transfer associated with the selection of data. Other aspects are described and claimed.

20 Claims, 5 Drawing Sheets

(56) References Cited

U.S. PATENT DOCUMENTS

2016/0328794 A1* 11/2016 Schrump ............... G06Q 40/02

* cited by examiner

AGGREGATE SERVICE WITH ENHANCED REMOTE DEVICE MANAGEMENT

BACKGROUND

People store information (e.g., images, documents, spreadsheets, music files, videos, etc.) within files and folders on information handling devices (e.g., smart phones, personal computers, laptop computers, tablets, personal digital assistants, eReaders, etc.). Cloud storage allows users the convenience of storing information using a remote storage location. Users are then able to access the information stored on the remote storage location from multiple information handling devices. Generally, this remote storage location requires the user to either move files from their local machine or store the information directly in the remote storage location. After the files are located in the remote storage location, a user can access the remote storage location from any information handling device by entering credentials allowing the remote storage device to authenticate the user.

BRIEF SUMMARY

In summary, one aspect provides a method, comprising: receiving, from a client device, a request by a user to access an aggregate service device; authenticating, at the aggregate service device, the user to provide access to at least one remote device; providing, by the aggregate service device, data analogous to data of the at least one remote device; receiving, by the aggregate service device, a selection of data accessible by the user from the at least one remote device; and facilitating data transfer associated with the selection of data.

Another aspect provides an aggregate service device, comprising: a processor; a memory device that stores instructions executable by the processor to: receive, from a client device, a request by a user to access an aggregate service device; authenticate the user to provide access to at least one remote device; provide data analogous to data of the at least one remote device; receive a selection of data accessible by the user from the at least one remote device; and facilitate data transfer associated with the selection of data.

A further aspect provides a product, comprising: a storage device having code stored therewith, the code being executable by the processor and comprising: code that receives, from a client device, a request by a user to access an aggregate service device; code that authenticates, at the aggregate service device, the user to provide access to at least one remote device; code that provides, by the aggregate service device, data analogous to data of the at least one remote device; code that receives, by the aggregate service device, a selection of data accessible by the user from the at least one remote device; and code that facilitates data transfer associated with the selection of data.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
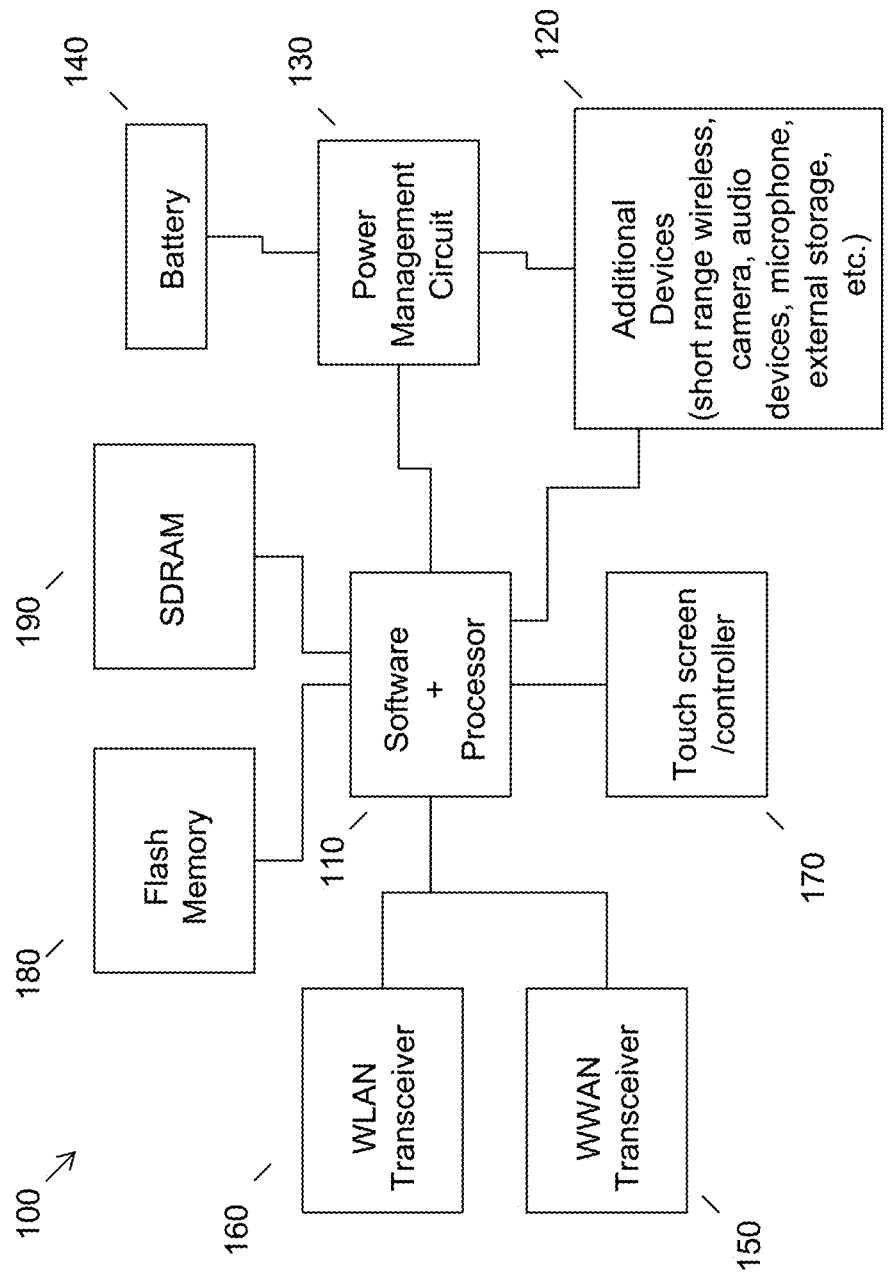
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Due to the decreasing cost of hard disk storage, the increasing speed of broadband, and the desire of the public to have access to their personal data regardless of their location, the availability of free or cheap cloud storage has increased exponentially in the past few years. Users may use different cloud storage services (e.g., DROPBOX, AMAZONS3, GOOGLE Drive, ONEDRIVE, SUGARSYNC, etc.) for different goals, for example, a user may have a personal cloud storage, work cloud storage, a user may allow access to others for one cloud storage account but not another, and the like. Additionally or alternatively, a user may wish to keep multiple cloud storage services/accounts active because each company or cloud storage service may offer different benefits. One problem with these multiple cloud storage services is that each service likely requires their own credentialing/authenticating service. Additionally, maintaining all of those separate accounts may be difficult. DROPBOX is a registered trademark of Dropbox, Inc. in the United States and other countries. AMAZON is a registered trademark of Amazon Technologies, Inc. in the United States and other countries. GOOGLE is a registered trademark of Google Inc. in the United States and other countries. ONE-DRIVE is a registered trademark of Microsoft Corporation in the United States and other countries. SUGARSYNC is a registered trademark of Sharpcast, Inc. in the United States and other countries.

Additionally, a user may wish to keep multiple accounts active on a single cloud service in order to compartmentalize their files (e.g., keeping work and home files separate, etc.). If a user has multiple active accounts, managing all of these accounts and the files stored within them may become overwhelming. Additionally, the authentication credentials (e.g., user names, passwords, biometric data, etc.) may be different for each cloud storage service. One solution is an application that allows a user to access multiple accounts from a single application. However, these applications generally only allow a user to add a single account from a particular provider. In other words, if a user has multiple accounts hosted by the same cloud storage service ("cloud storage provider") (e.g., a GOOGLE Drive account for personal use and a GOOGLE Drive account for school use, etc.), the user could not access these multiple accounts from a single application. If the user wishes to see content from a different account (e.g., work, home, family, personal, friends, etc.) hosted by the same service provider, the user generally must log-out of the current account and log-in again using the other account. Therefore, currently available applications/mechanisms to access/leverage cloud resources from an information handling device are inefficient. Additionally, due to problems with interactions with the cloud storage services (e.g., delay in content delivery, performance when interacting with a cloud resource, etc.) the interactions may result in an overall poor customer experience.

An additional problem with these applications is the application generally only allows access to cloud storage services. However, a user may wish to access files stored on one of their own information handling devices (for example, home computer, work computer, smart phone, tablet, and the like ("non-local user device" or "remote device") from a different information handling device ("client device" or "local device"). For example, a user may wish to access a picture stored on a home PC from their smartphone or tablet. Allowing a user to view, in a single graphical user interface (GUI), all of their personal devices and/or cloud storage services/accounts and the data included on those devices, would allow the user to access to all of their files regardless of which device the user is using to access the information. Additionally, the user could access the information from any location. Currently, no single solution provides everything required for an efficient interaction with the multiple cloud storage services.

In addition to the issues with managing a large array of cloud storage services/accounts, users also have the issue of their electronic data volume rapidly increasing. Thus, even if a user has access to the desired data, the user may have difficulties in locating a particular piece of data. In current solutions, when a user performs a local search and the search fails to locate the desired data, a user cannot easily make the same search while increasing the search to cloud based data or data stored on other user devices. Therefore, the user may be required to perform multiple searches on each of the devices where the desired data may be stored. Thus, a search solution that offers a search function across multiple cloud services and/or user devices is needed.

A user who has stored information on a multitude of storage devices (e.g., non-local user devices, local devices, removable devices, cloud storage devices, etc.) may find it difficult to share data with others. This is especially problematic when a user is using a mobile device with a low storage capacity. For example, a user may wish to post a picture to social media. However, the picture may be stored on their home computer and they are currently using their smart phone. Additionally or alternatively, if a user is attempting to share a file stored in a remote location (e.g., cloud storage device, non-local user device, etc.), the user may be required to perform cumbersome and time consuming steps. For example, a user may be required to locate the remote device or cloud account, enter credentials for authentication, open a sharing application, possibly enter credentials for authentication within the sharing application, and then locate the data stored on the device to be shared. A solution that has the ability to share files that exist on remote devices or cloud storage in an aggregated console is needed.

Accordingly, an embodiment provides a method of connecting multiple remote and local devices (e.g., desktops, laptops, smartphones, tablets, etc.) and cloud storage services/accounts/devices to a single aggregate service/application. In one embodiment, when a device (e.g., remote, local, cloud service, etc.) is connected to the aggregate service, the data that the aggregate service may access may be limited by the device connected to the aggregate service. For example, a device may limit access to the data stored on the device by use of credentials and/or accounts set-up on the device (e.g., the user cannot share files that belong to a different user on the same device). One embodiment, allows a user, when connecting a device to the aggregate service, to select which files or folders may be shared with the aggregate service. For example, a user may choose to share photos but not financial documents saved on the computer. In a further embodiment, the data selected to be shared may be selected by the aggregate service, based on a predetermined configuration, for example, the aggregate service may automatically share user folders (e.g., "My Documents", "My Music", "My Pictures", "My Video", and the like).

In one example embodiment, an aggregate service may receive access to a selection of data, (e.g., the data chosen by the user to be shared), that is stored on a remote device (e.g., a device that is connected to the aggregate service information handling device). The selection of data may consist of data accessible by a particular user. In other words, for the aggregate service to receive access to the data (e.g., files, folders, etc.), the user must have access to the files, for example, via the operating system credentials of the remote device. In one embodiment, after receiving access, the aggregate service may record and store data analogous to data stored on the device. This analogous data may include meta data related to the files on the device (e.g., the title, abstract, author, keywords, file size, data type, data location, creation date, etc.). In one embodiment, the analogous data may be a copy of the data stored on the device. Alternatively or additionally, the analogous data may be the actual data stored on the device. This analogous data may be stored by the aggregate service to allow a user to see all of their files in one location, without actually requiring the files to be stored in that single location and thereby conserving resources and reducing cost to the user.

In one embodiment, the aggregate service may receive a request by the user to access the aggregate service. When this request is received, the aggregate service may authenticate the user. In one embodiment this authentication may be by use of credentials entered by the user. Additionally or alternatively, this authentication may be by use of one or multiple tokens. These tokens may be derived from the credentials previously entered by the user, and may be used to determine what user is requesting access to the aggregate service. Alternatively, these tokens may store the credentials previously entered by the user. Once the user is authenticated, the data contained within the aggregate service may be provided to the user. This providing may include displaying the data on a display device (e.g., computer monitor, smartphone display, tablet display, etc.). Alternatively or additionally, the providing may include transferring or outputting the data in some format.

In accordance with one embodiment, after a user has entered their credentials and have been granted access to the aggregate service, the user may select data located on a device using the aggregate service. The ability of the user to select data may be limited to that data to which the user has access. The aggregate service may assist in facilitating a data transfer associated with the data selected by the user. For example, the user may be able to request files transfers from any remote device connected and known to the aggregate service. For example, the user could request a photo located on their home PC be transferred to their smartphone for viewing. In an additional embodiment, the user may be able to request file transfers from a local device to any other device (e.g., non-local user device, cloud storage device, etc.) connected and known to the aggregate service. For example, the user could request a photo be sent from their work PC to their home PC for long term storage. In another embodiment, the user may be able to request files transfers between multiple devices, connected and known to the aggregate service, using their local device. For example, the user could request a photo be moved from their SUGARSYNC account to their phone using their work PC.

In an embodiment, the remote and local devices connected to the aggregate service may maintain at least one authentication token for access to the aggregate service. Alternatively or additionally, the aggregate service may maintain at least one authentication token for all known and connected devices (e.g., personal devices, cloud storage services, etc.). This improves the user experience and reduces the number of times a user must provide authentication credentials in order to access their data regularly. In a particular embodiment, for a user to receive access to the selected data stored on a remote device (e.g., personal computer, smartphone, tablet, etc.) the remote device may have an open communication connection with the aggregate service. The remote device may maintain this open communication connection by providing a token(s) to the aggregate service for authentication. This token may contain the credentials previously entered by the user or may alternatively contain information derived from the credentials previously entered by the user.

In one embodiment, the token may comprise a refresh token which may maintain the authentication credentials for a particular remote device for a set period of time (e.g., weeks, days, months, etc.). The refresh token's lifespan or duration of authentication may be predetermined by an embodiment, modified by the user, or using some other criteria. This allows a user who may be more concerned with the security of their electronic data to set a more stringent (e.g., shorter) time length on the accessibility of their data. Moreover, the refresh token may be refreshed (i.e., renewed), for example, when the user subsequently requests access to the aggregate service or logs into the remote device. Thus, as an example, as long as a user requests access to the aggregate service once every month, the user will not be required to reenter credentials.

Additionally, an embodiment provides a method where the aggregate service receives authentication to access data stored in a cloud storage service/account/device. For example, when connecting the cloud account to the aggregate service, the user may enter their cloud account credentials, thereby, enabling the aggregate service to access all or some of the files contained within the cloud account. In one embodiment, the user may then grant the aggregate service access to a selection of the data based upon user selection (i.e., the data chosen by the user to be shared).

In one embodiment, the user credentials relating to the cloud storage service are not examined by the aggregate service, instead they are passed directly to the cloud storage service provider. For example, in one embodiment, a user may log into the aggregate service and may connect the cloud account to the aggregate service. Upon opening this connection, a user may be presented with the credentialing service of the cloud account/service. The user may then enter their credentials directly into the cloud service credentialing service and the aggregate service is never privy to this information. In one embodiment, upon successful completion of entering these credentials, the aggregate service may be presented a token for use in any subsequent authentications between the aggregate service and the cloud storage service, thereby granting further identity protection to the user.

Additionally, an embodiment may allow the user to authenticate access to a plurality of cloud storage systems hosted by a single provider (e.g., a GOOGLE account for work, home, family, personal, friends, etc.) In one embodiment, the aggregate service stores data analogous to data of the plurality of cloud storage accounts. This analogous data may include, for example, meta data (e.g., title, abstract, author, keywords, file size, data type, data, location, creation date, etc.), hierarchy data, and the like. Alternatively or additionally, the analogous data may include the actual data from the cloud device. For example, the aggregate service may copy the data from the cloud device and store the data within memory within the aggregate service. Alternatively or additionally, the data included within the aggregate service may include the actual data as stored within the cloud account. This analogous data may be stored by the aggregate service to allow a user to see all of their files, stored across all of their devices and cloud storage services, in one location. The storing of the analogous data may allow the information to be readily available to the user, without actually requiring the files to be stored in a single aggregate location and thereby conserving server resources and minimizing cost.

In a further embodiment, once a user has been granted access to the aggregate service, the aggregate service may provide the analogous data. This providing may include displaying the data or may include outputting the data in some formatting. One embodiment may receive a selection of data. For example, the user may select data stored on a cloud storage device. One embodiment may then facilitate a data transfer associated with the selection of data. For example, the user may request files be transferred from a cloud storage service connected and known to the aggregate service to a local device. For example, the user can request a photo located in their Google Drive be transferred to their smartphone. In an additional embodiment, a user may request a file from their local device be transferred to any cloud storage service connected and known to the aggregate service. For example, the user can request a picture located on their phone be transferred to their GOOGLE Drive. In one embodiment, a user may be able to transfer files between multiple cloud storage systems connected and known to the aggregate service, using their local device. For example, the user could request a photo be moved from their GOOGLE Drive to their DROPBOX through the use of their phone.

In one embodiment, the aggregate service may receive a request by the user to access the aggregate service. When this request is received, the aggregate service may authenticate the user. In one embodiment this authentication may be by use of credentials entered by the user. Additionally or alternatively, this authentication may be by use of one or multiple tokens. These tokens may contain or be derived from credentials previously entered by the user, and may be used to determine what user is requesting access to the aggregate service. For example, one embodiment may provide tokens to the local device from the aggregate service so that the user does not have to enter their credentials every time the user wants to access the aggregate service. Once the user is authenticated, the data contained within the aggregate service may be provided to the user, for example, displayed to the user on a display device (e.g., computer monitor, smartphone display, tablet display, etc.). After the user has been authenticated, the user may have the ability to manipulate data, for example, as described above.

Managing an abundance of files, across a wide variety of platforms, (e.g., personal computers, tablets, smartphones, cloud storage services, etc.) may be difficult to organize and maintain for a user. Thus, in order to enable a user to manage files within or accessible by the aggregate service, an intuitive user interface may be useful. In one embodiment, a graphical user interface with a file manager format may be provided. An embodiment may provide a method for receiving file system data and displaying this data in a user interface, for example, in the form of a file manager application (e.g., WINDOWS explorer, MAC OS X Finder, DOLPHIN in KDE, NAUTILUS in GNOME, etc.). The file manager application may display all the data stored in or accessible by the aggregate service, for example, in a folder structure similar to what a typical user would be comfortable operating (e.g., that of a normal operating system). For example, the file manager may display all of the users personal devices linked to the aggregate service, all cloud storage services linked to the aggregate service, and any other storage devices. WINDOWS is a registered trademark of Microsoft Corporation in the United States and other countries. MAC and OS X are registered trademarks of Apple Inc. in the United States and other countries. DOLPHIN is a registered trademark of KDE e.V. in the United States and other countries. NAUTILUS and GNOME are registered trademarks of the Gnome Foundation in the United States and other countries.

In a further embodiment, the user may be able to manipulate the data, for example, dragging and dropping data from one device to another device using the interface. For example, the file manager may be able to receive data stored on any of the storage devices (e.g., personal devices, cloud storage devices, removable storage devices, local device, etc.) using the aggregate service. In one embodiment, using the file manager the user may request files to be transferred from any remote device or cloud storage device known and connected to the aggregate service to a local device. For example, a user may drag files from their GOOGLE drive to their PC desktop. In an additional embodiment, the user may request a file from their local device to be transferred to any remote device or cloud storage device known and connected to the aggregate service. For example, a user may request a picture from their desktop be transferred to their GOOGLE Drive for storage. In one embodiment, a user may transfer files between remote devices and cloud storage services, known and connected to the aggregate service, using their local device. For example, a user could request a photo be transferred from their home PC to their GOOGLE Drive using their phone.

Typically, when a user is using a mobile device with a low storage capacity, they may store most of their data using a cloud service or on alternative devices. However, a user may wish to make use of the data stored on the alternate storage device (e.g., cloud service, removable storage device, remote device, etc.) while using their mobile device, without actually transferring the data to their mobile device. For example, a user may wish to post a picture or file stored on their home computer to a social media service using their mobile device. Thus, an embodiment provides the ability to share files that exist on any of the connected storage devices (e.g., personal devices, cloud storage devices, removable storage devices, local devices from the aggregate service, etc.) in an aggregated console. One embodiment may send a distribution command which may, for example, include a pointer (e.g., a link or physical address or location of the file requested) in response to a user selecting a selection of data within the aggregate service. The distribution command, in one embodiment, may then be passed to the aggregate service to indicate how the pointer should be distributed.

In one embodiment, the distribution of the pointer may take place automatically based on some predetermined function of an application. Additionally or alternatively, it may be determined by the user (e.g., the user posting a photo on FACEBOOK or TWITTER). In one embodiment, the distribution command may comprise information for attaching the pointer to an electronic communication (e.g., an email or text message). In another embodiment, the distribution command may comprise information for distributing a hyperlink that may link directly to the file location. The hyperlink may be designed for public access or require credentials to view depending on the user's needs. In one embodiment, the distribution command may comprise information for utilizing a short range communication protocol (e.g., near field communication (NFC), radio frequency identification (RFID), etc.) or a tool like SHAREit (a Lenovo application) to allow for quick distribution to one or multiple nearby devices without requiring the need for additional hardware or transmission protocols. In another embodiment, the distribution command may comprise utilizing a sharing application present on the device (e.g., android share), allowing the user to select a distribution means associated with an existing application (e.g., GOOGLE hangouts, TWITTER, short message service (SMS), etc.). FACEBOOK is a registered trademark of Facebook, Inc. in the United States and other countries. TWITTER is a registered trademark of Twitter, Inc. in the United States and other countries.

In one embodiment, once a user accesses the aggregate service, the user may enter search criteria. An embodiment may search the analogous data stored on the aggregate service device utilizing search criteria provided by the user. For example, a user may enter the search term "pictures from the Grand Canyon", an embodiment may then search for the term "pictures from the Grand Canyon" within the data stored on or accessible by the aggregate service device. In one embodiment the search may be completed using an index. This index may contain details of the data stored on the aggregate service device. For example, one embodiment may monitor the data stored on the one or more storage devices. Upon receiving updated data, an embodiment may create an index detailing the data, which may then be searched by an embodiment.

Upon receiving results produced by the search, an embodiment may display the search results on a device. An additional embodiment may allow a user to filter or sort the results once the results are displayed. The filtering and sorting by the user may be completed using analogous data associated with the data, as described above, or may be completed by using the type of device. One embodiment may, once the searching has been completed, determine the most relevant search results. Once the determination is made, the search results that are displayed may include a predetermined selection of the most relevant results. This predetermined selection may include a default or user configured number. Additionally or alternatively, this predetermined selection may be based upon analogous data included with the data. For example, the predetermined selection may include only data created within the last week. One embodiment may, after displaying a sub-set of the results may receive a user input requesting expanded results. These expanded results may comprise additional results returned by the searching.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, microphone, biometric scanner, and the like. System 100 often includes a touch screen 170 for data input and display/rendering. System 100 also typically includes various memory devices, for example flash memory 180 and SDRAM 190.

Figure 2:
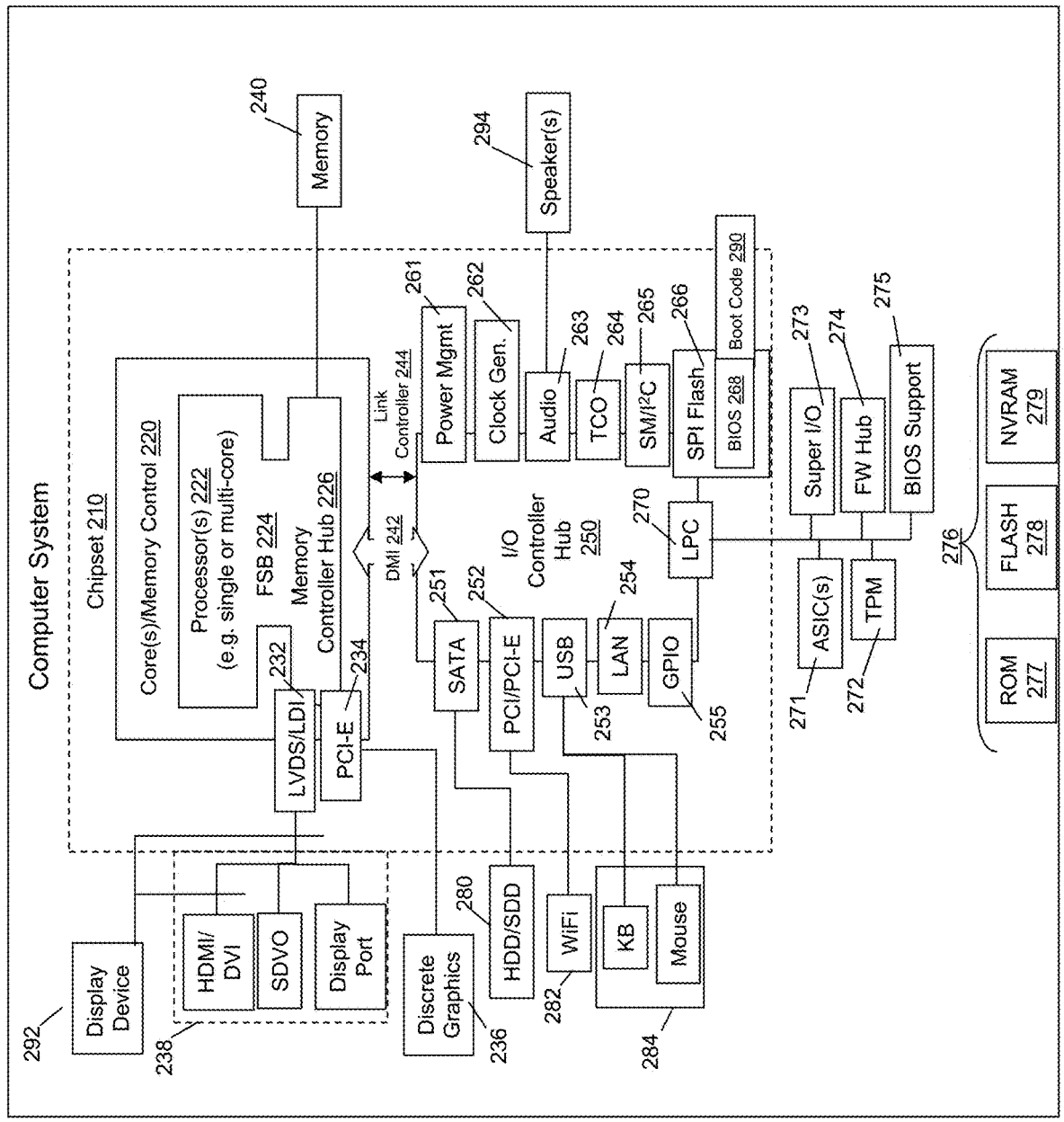
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touchscreen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use to access information. For example, the circuitry outlined in FIG. 1 may be implemented in a tablet or smart phone embodiment, whereas the circuitry outlined in FIG. 2 may be implemented in a personal computer embodiment. Additionally, information handling device circuitry such as that outlined in FIG. 1 and/or FIG. 2 may be used by an aggregate service.

Figure 3:
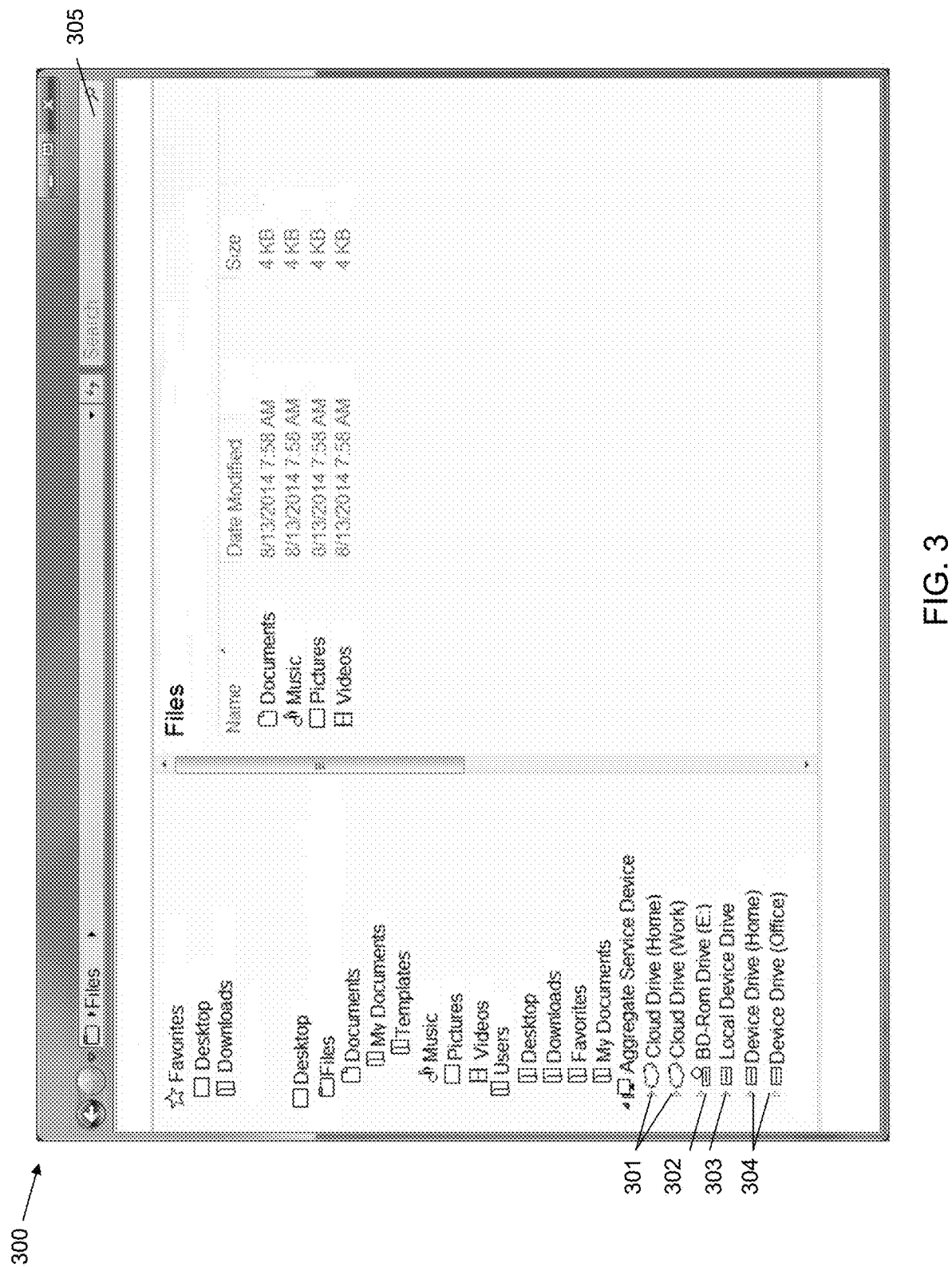
FIG. 3 illustrates an example file manager system used by the aggregate server.

FIG. 3 represents an example user interface provided by an aggregate service. The system 300 is a file manager system. However, an embodiment may present a different type of management system. On the left side of the user interface, different devices the aggregate service may have access to are shown. For example, the user currently authenticated by the device has access to cloud storage devices 301, removable storage devices 302, local storage devices 303, and remote storage devices 304, and the like. Additionally, search functionality 305 may be provided. When a user selects a device, the right side of the user interface may show the files, folders, and data included on the selected device. Other layouts are possible. A user may be able to select (e.g., highlighting, right clicking with a mouse, function clicking, etc.) a device (e.g., 301, 302, 303, 304, etc.), and be provided options or selections within the interface. For example, a user may be able to disconnect the device by right clicking on the device.

Figure 4:
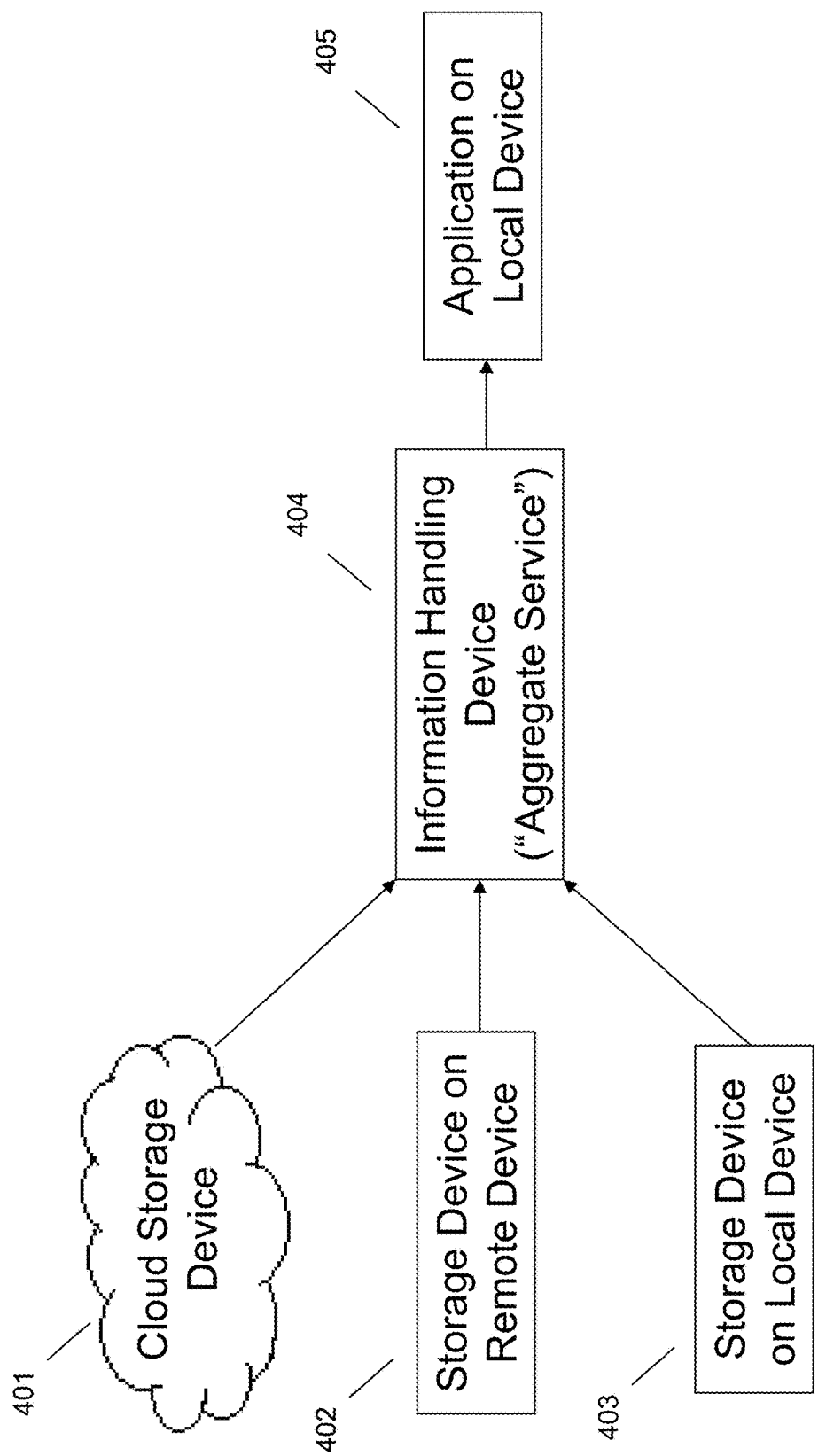
FIG. 4 illustrates an example diagram flow of information from a storage location to display on a local device.

FIG. 4 represents a flow of data from a device to a user. An aggregate service 404, which may be an information handling device including circuitry represented by FIG. 1 and/or FIG. 2, may receive access to multiple storage devices. For example, the aggregate service 404 may have access to one or more cloud storage devices 401, one or more storage devices on a remote device ("remote storage device") 402, one or more storage devices on a local device ("local storage device") 403, and the like.

The remote and local storage devices may include storage devices integral to the device (e.g., hard drive, memory, etc.) or may include removable storage devices (e.g., flash storage, external hard drive, USB storage devices, memory sticks, etc.). These devices may be connected to the aggregate service 404 using a wired, wireless, or virtual connection. For example, a user may set up a remote device to communicate with the aggregate service device. The aggregate service may then access the remote device and the data stored on the remote device using a network connection. In one embodiment, the aggregate service 404 may provide an application to a local device 405. This application 405 may then be accessed by a user to access the aggregate service 404. The application 405 may additionally be presented as a user interface as shown in FIG. 3.

Figure 5:
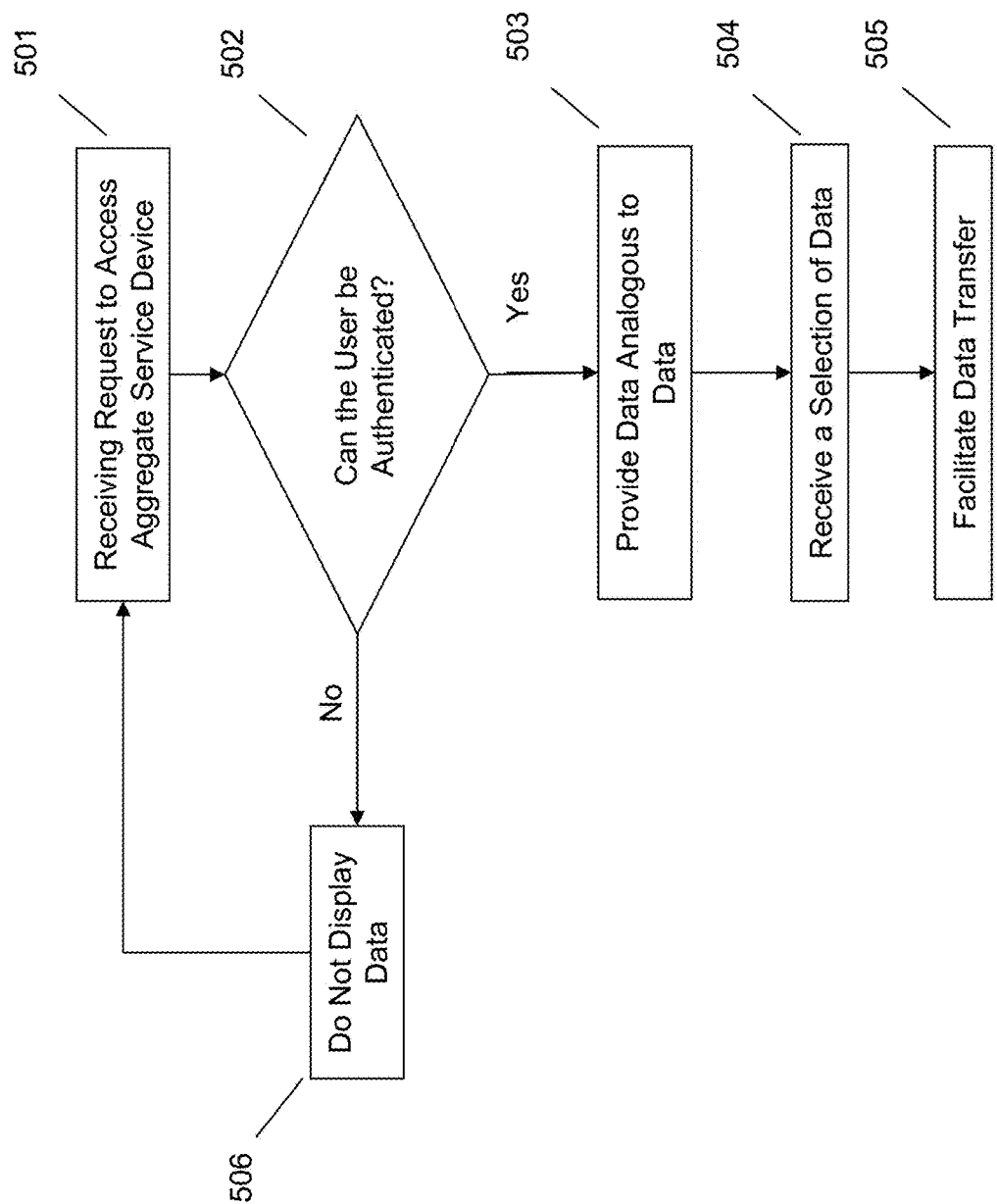
FIG. 5 illustrates an example method of aggregate service with enhanced remote device management.

Referring now to FIG. 5, an embodiment may receive, from a client device, a request by a user to access an aggregate service device at 501. For example, a user may access/open an application representing the aggregate service (e.g., as shown in FIG. 3). Upon receiving this request an embodiment may try to authenticate the user at 502 to provide access to at least one remote device. This authentication may be used to determine that the user who is trying to access the aggregate service device is the user who has access to the remote devices and/or the information stored on the remote devices. The authentication may require the user to enter credentials (e.g., user name, password, fingerprint data, audio data, video data, image data, etc.), which may be sent to the aggregate service device for authentication. In one embodiment, these credentials may be packaged as a token to be sent to the aggregate service device for authentication. The credentials may, in one embodiment, be compared with credentials stored within the aggregate service device to determine to which data and device the user may have access.

Alternatively or additionally, upon receiving and authenticating the credentials an embodiment may provide a token (s) to the local device. This token(s) may then allow a user to access the aggregate service without entering credentials. For example, upon subsequent access requests to the aggregate service device, a user may not have to enter credentials, instead the token(s) may be presented to the aggregate service device for authentication. The token(s) may include the user credentials or may, alternatively or additionally, include information derived from the user credentials. The token(s), in one embodiment, may include an access token delineating which data a user may access. The token(s) may include a refresh token which may continually refresh the authentication so the user does not have to log into the aggregate service. The refresh token may allow the user to remain logged into the aggregate service device for a predetermined period of time (e.g., weeks, months, etc.). These tokens may be as described above (e.g., access token, refresh token, etc.) or they may include another form of token. Additionally or alternatively, an embodiment may use a different method of single sign on (SSO) authentication.

The user may have previously set up at least one remote device to be connected to and communicating with the aggregate service device. For example, an embodiment may receive access to the remote device from the user allowing access. For example, a user may from the remote device, set up the remote device to communicate with the aggregate service. For example, a user may access the aggregate service using a remote device. The user may have to enter credentials to access the aggregate service. Once the user has entered the credentials, the remote device may receive a token(s) from the aggregate service device. This may allow a user to be not required to enter credentials upon subsequent access to the aggregate service. Additionally, the tokens may allow a remote device to remain connected to the aggregate service device with no input from the user.

Alternatively or additionally, a user may know the unique label (e.g., IP address, MAC address, device name, etc.) of the device and may from the aggregate service set up the remote device to communicate with the aggregate service. For example, a user may provide credentials for the remote device to the aggregate service which the aggregate service may use to access the remote device. For example, a user may access the remote device from the aggregate service and be presented with a display requesting the user enter the credentials associated with the remote device (e.g., user name, password, fingerprint scan, voice recording, etc.). In one embodiment, the credentials may be sent to the remote device. Additionally, tokens may be received from the remote device. This authentication may allow an embodiment to access the remote device. The tokens may allow authentication of the user without requiring the user to enter credentials. For example, an embodiment may receive an access token delineating the data the user has access to. An embodiment may additionally or alternatively receive a refresh token which allows the user to remain logged into the remote device for a predetermined period of time (e.g., weeks, months, etc.).

If an embodiment cannot authenticate the user at 502, an embodiment may not display the data at 506 and wait until it receives a request to access the aggregate service device at 501. If, however, an embodiment can authenticate the user at 502, an embodiment may provide data analogous to data of the at least one remote device at 503. The providing may include displaying on a display device the data analogous to the selection of data. For example, a user may be presented a user interface (e.g., as shown in FIG. 3) associated with the aggregate service and may see the data stored within or accessible by the aggregate service. Other methods of providing including outputting, storing, or transferring data are possible.

The analogous data may include meta data about the data, for example, the title, abstract, author, keywords, file size, data type, data location, creation date and time, modified date and time, and the like. Additionally or alternatively, this analogous data may include some form of the actual data which is stored on the remote device. For example, an embodiment may copy the files from the remote device and store them within memory of the aggregate service device. The analogous data may include other types of data which may be used by the aggregate service to display the data, for example hierarchy data or index data.

At 504, an embodiment may receive a selection of data accessible by a user from the remote device. The selection of data may be limited to data accessible by the user who requested access to the aggregate service device at 501 and was authenticated at 502. For example, due to a set of privileges (e.g., permissions) on the remote device, a user may only be able to access certain files on the remote device (e.g., the user's login credentials for the remote device only allow access to particular files). Alternatively or additionally, the selection of data accessible by the user may be limited by the user. For example, a user may select, for example, when setting up the connection between the remote device and aggregate service, which data may be accessed by the aggregate service. For example, a user may allow the aggregate service to access music files but not word processing documents. Alternatively or additionally, the selection of data may be determined by the aggregate service device. For example, the aggregate service may have default folders and/or files which it is set up to access. As an example, the aggregate service may access only folders where the user is the author. In other words, an embodiment may honor the user's privileges.

At 505, an embodiment may facilitate a data transfer associated with the selection of data. For example, once a user has accessed the aggregate service, the user may be able to manipulate the data stored on remote devices. One example embodiment allows a user to transfer files between remote devices. For example, the aggregate service device may transfer data between one remote device and a second remote device. For example, the user may transfer files from their home computer to their work computer using their smartphone. One embodiment allows a user to transfer files between a remote device and a client ("local") device. For example, the remote device may be a user's home computer, and the client device may be the device the user is using to access the aggregate service device. One embodiment may transfer data from the client device (e.g., the device the user is using to access the aggregate service) to a remote device (e.g., a device the user is not currently using to access the aggregate service).

The facilitation at 505 may, for example, include providing pointers from a source to a destination. Alternatively or additionally, the facilitation may include actually copying or moving a file from a source device and moving it to the aggregate service device. The file may then be copied or moved from the aggregate service device to the destination device. Other methods of facilitating data transfer are possible and known in the art. One embodiment may search the data stored on or accessible by the aggregate service device after being provided search criteria from the user. The data, as stored on the aggregate service device, may comprise index data, which may allow for faster searching.

Accordingly, as illustrated by the example embodiments and figures, an embodiment provides an aggregate service. The aggregate service provides an application which allows a user to access remote devices, cloud storage devices, local storage devices, removable storage devices, and the like. The aggregate service may receive access to these devices through a user connecting the device to the aggregate service providing a communication link between the devices and the server. An embodiment may allow the aggregate service to not only connect to one type of storage device but also to connect to multiple storage devices, including multiple storage devices of the same type (e.g., more than one remote device, more than one cloud storage device, more than one cloud storage device hosted by the same provider, etc.). Once these devices have been connected, an embodiment may provide a user interface allowing a user to access the multiple devices using a single interface. The user, in one embodiment, may additionally be able to share files and search for files across multiple devices, possibly through use of the interface. Thus, an embodiment provides an application which allows a user to access multiple storage devices located in multiple locations and manipulate the data stored within the storage devices easily and seamlessly.

Additional details regarding the above discussed embodiments can be found in co-pending and commonly assigned U.S. patent applications: "AGGREGATE SERVICE WITH ENHANCED CLOUD DEVICE MANAGEMENT" U.S. Pat. No. 9,652,465, "AGGREGATE SERVICE WITH USER INTERFACE" U.S. patent application Ser. No. 14/528,293, "AGGREGATE SERVICE WITH FILE SHARING" U.S. patent application Ser. No. 14/528,327, and "AGGREGATE SERVICE WITH SEARCH CAPABILITIES" U.S. patent application Ser. No. 14/528,359 all of which are filed concurrently herewith and incorporated by reference herein.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, from a client device, a request provided by a user to access an aggregate service device comprises a single application having a user interface accessible by the user, the aggregate service device connecting to and displays within the user interface a plurality of storage devices of the user providing the request, wherein the request provided by the user comprises user credentials for accessing the aggregate service device;
   providing access to the user, at the aggregate service device, to data of at least one remote device of the user from the aggregate service device by authenticating the user at the at least one remote device through the aggregate service device, wherein authentication of the user at the at least one remote device and to at least a subset of the data is provided by the aggregate service device providing data associated with the user credentials to the at least one remote device;
   providing, on a user interface associated with the aggregate service device, data analogous to the data of the at least one remote device;
   receiving, at the aggregate service device, an indication of a selection of data of the at least one remote device selected by the user through the user interface; and
   facilitating data transfer associated with the selection of data.

2. The method of claim 1, wherein facilitating data transfer associated with the selection of data comprises transferring data between a first remote device and a second remote device.

3. The method of claim 1, wherein facilitating data transfer associated with the selection of data comprises transferring data between the client device and the at least one remote device.

4. The method of claim 1, wherein the selection of data accessible by the user is limited based on a set of privileges associated with the user stored on the at least one remote device.

5. The method of claim 1, wherein the selection of data accessible by the user is user configurable.

6. The method of claim 1, wherein the selection of data accessible by the user is predetermined by the aggregate service device.

7. The method of claim 1, further comprising searching index data stored on the aggregate service device based on search criteria received from the user.

8. The method of claim 1, wherein the authenticating comprises receiving a token derived from the user entering credentials associated with the aggregate service device.

9. The method of claim 8, further comprising using the token for subsequent authentications to the aggregate service device.

10. The method of claim 1, wherein the data analogous to data of the at least one remote device is selected from a group consisting of: title, abstract, author, keywords, file size, data type, data location, creation date, hierarchy data, and file data.

11. An aggregate service device, comprising:
    a processor;
    a memory device that stores instructions executable by the processor to:
    receive, from a client device, a request provided by a user to access an aggregate service device comprises a single application having a user interface accessible by the user, the aggregate service device connecting to and displays within the user interface a plurality of storage devices of the user providing the request, wherein the request provided by the user comprises user credentials for accessing the aggregate service device;
    provide access to the user, at the aggregate service device, to data of at least one remote device of the user from the aggregate service device by authenticating the user at the at least one remote device through the aggregate service device, wherein authentication of the user at the at least one remote device and to at least a subset of the data is provided by the aggregate service device providing data associated with the user credentials to the at least one remote device;
    provide, on a user interface associated with the aggregate service device, data analogous to data of the at least one remote device;
    receive an indication of a selection of data of the at least one remote device selected by the user through the user interface; and
    facilitate data transfer associated with the selection of data.

12. The aggregate service device of claim 11, wherein to facilitate data transfer associated with the selection of data comprises transferring data between a first remote device and a second remote device.

13. The aggregate service device of claim 11, wherein to facilitate data transfer associated with the selection of data comprises transferring data between the client device and the at least one remote device.

14. The aggregate service device of claim 11, wherein the selection of data accessible by the user is limited based on a set of privileges associated with the user stored on the at least one remote device.

15. The aggregate service device of claim 11, wherein the selection of data accessible by the user is user configurable.

16. The aggregate service device of claim 11, wherein the selection of data accessible by the user is predetermined by the aggregate service device.

17. The aggregate service device of claim 11, wherein the instructions are further executable by the processor to search index data stored on the aggregate service device based on search criteria received from the user.

18. The aggregate service device of claim 11, wherein to authenticate comprises receiving a token derived from the user entering credentials associated with the aggregate service device.

19. The aggregate service device of claim 18, wherein the instructions are further executable by the processor to use the token for subsequent authentications to the aggregate service device.

20. A product, comprising:
  a storage device having code stored therewith, the code being executable by a processor and comprising:
  code that receives, from a client device, a request provided by a user to access an aggregate service device comprises a single application having a user interface accessible by the user, the aggregate service device connecting to and displays within the user interface a plurality of storage devices of the user providing the request, wherein the request provided by the user comprises user credentials for accessing the aggregate service device;
  code that provides access to the user, at the aggregate service device, to data of at least one remote device of the user from the aggregate service device by authenticating the user at the at least one remote device through the aggregate service device, wherein authentication of the user at the at least one remote device and to at least a subset of the data is provided by the aggregate service device providing data associated with the user credentials to the at least one remote device;
  code that provides, on a user interface associated with the aggregate service device, data analogous to data of the at least one remote device;
  code that receives, at the aggregate service device, an indication of a selection of data of the remote device selected by the user through the user interface; and
  code that facilitates data transfer associated with the selection of data.

* * * * *